United States Patent
McGregor, Jr.

(10) Patent No.: US 7,103,180 B1
(45) Date of Patent: Sep. 5, 2006

(54) METHOD OF IMPLEMENTING THE DATA ENCRYPTION STANDARD WITH REDUCED COMPUTATION

(75) Inventor: John Patrick McGregor, Jr., Princeton, NJ (US)

(73) Assignee: Hewlett-Packard Development Company, L.P., Houston, TX (US)

(*) Notice: Subject to any disclaimer, the term of this patent is extended or adjusted under 35 U.S.C. 154(b) by 847 days.

(21) Appl. No.: 10/001,682

(22) Filed: Oct. 25, 2001

(51) Int. Cl.
*H04L 9/28* (2006.01)

(52) U.S. Cl. .......................... 380/28; 380/29
(58) Field of Classification Search .................. 380/28
See application file for complete search history.

(56) References Cited

U.S. PATENT DOCUMENTS

| | | | |
|---|---|---|---|
| 3,962,539 A | | 6/1976 | Ehrsam et al. |
| 4,262,358 A * | | 4/1981 | Marino, Jr. .................. 714/805 |
| 4,274,085 A * | | 6/1981 | Marino, Jr. .................. 380/29 |
| 4,275,265 A * | | 6/1981 | Davida et al. ................ 380/29 |
| 4,543,646 A * | | 9/1985 | Ambrosius et al. ........... 380/29 |
| 4,578,530 A * | | 3/1986 | Zeidler ........................ 705/71 |
| 4,731,843 A * | | 3/1988 | Holmquist .................... 380/29 |
| 5,003,597 A * | | 3/1991 | Merkle ........................ 380/37 |
| 5,008,935 A * | | 4/1991 | Roberts ....................... 380/29 |
| 5,214,703 A * | | 5/1993 | Massey et al. ................ 380/37 |
| 5,317,638 A * | | 5/1994 | Kao et al. ..................... 380/29 |
| 5,432,848 A * | | 7/1995 | Butter et al. ................... 380/2 |
| 5,511,123 A * | | 4/1996 | Adams ......................... 380/29 |
| 5,513,262 A * | | 4/1996 | van Rumpt et al. ........... 380/29 |
| 5,623,549 A * | | 4/1997 | Ritter .......................... 380/37 |
| 5,673,319 A * | | 9/1997 | Bellare et al. ............... 713/181 |
| 5,724,428 A * | | 3/1998 | Rivest ......................... 380/37 |
| 5,745,577 A * | | 4/1998 | Leech ......................... 380/28 |
| 5,796,837 A * | | 8/1998 | Kim et al. .................... 380/28 |
| 5,825,886 A * | | 10/1998 | Adams et al. ................ 380/28 |
| 5,835,599 A * | | 11/1998 | Buer ........................... 380/29 |
| 5,835,600 A * | | 11/1998 | Rivest ......................... 380/44 |
| 5,838,795 A * | | 11/1998 | Mittenthal ................... 380/28 |
| 5,861,662 A * | | 1/1999 | Candelore .................... 380/30 |
| 6,005,944 A * | | 12/1999 | Blaze .......................... 380/42 |
| 6,031,911 A * | | 2/2000 | Adams et al. ................ 380/29 |

(Continued)

OTHER PUBLICATIONS

Menezes et al., Handbook of Applied Cryptography, CRC Press, 1997, pp. 250-259.*

(Continued)

*Primary Examiner*—Ayaz Sheikh
*Assistant Examiner*—David Garcia Cervetti

(57) ABSTRACT

An efficient software implementation of the round function of the Data Encryption Standard (DES) involves mathematical transformations performed on the DES round function and the DES round key computation function that reduce the computation required to complete a DES round on general-purpose, embedded, and cryptographic processors. These transformations shift computation associated with the Expansion Permutation from the DES round function to the DES round key computation function. As a result, fewer instructions are required to compute the inputs of the DES S-boxes in the round function.

19 Claims, 6 Drawing Sheets

| $y_1$ | $y_2$ | $y_3$ | $y_4$ | $y_5$ | $y_6$ | $y_7$ | $y_8$ | $y_9$ | $y_{10}$ | $y_{11}$ | $y_{12}$ |

| $k_1$ | $k_2$ | $k_3$ | $k_4$ | $k_5$ | $k_6$ | $k_7$ | $k_8$ | $k_9$ | $k_{10}$ | $k_{11}$ | $k_{12}$ |

U.S. PATENT DOCUMENTS

| | | | |
|---|---|---|---|
| 6,199,162 B1* | 3/2001 | Luyster | 713/168 |
| 6,215,875 B1* | 4/2001 | Nohda | 380/202 |
| 6,226,382 B1* | 5/2001 | M'Raihi et al. | 380/28 |
| 6,266,412 B1* | 7/2001 | Berenzweig et al. | 380/37 |
| 6,278,783 B1* | 8/2001 | Kocher et al. | 380/277 |
| 6,314,186 B1* | 11/2001 | Lee et al. | 380/28 |
| 6,320,964 B1* | 11/2001 | Callum | 380/29 |
| 6,324,286 B1* | 11/2001 | Lai et al. | 380/29 |
| 6,526,505 B1* | 2/2003 | Epstein | 713/150 |
| 6,578,061 B1* | 6/2003 | Aoki et al. | 708/520 |
| 6,578,150 B1* | 6/2003 | Luyster | 380/37 |
| 6,751,319 B1* | 6/2004 | Luyster | 380/37 |
| 6,775,776 B1* | 8/2004 | Vogt et al. | 713/186 |
| 6,891,951 B1* | 5/2005 | Inoha et al. | 380/44 |
| 6,914,984 B1* | 7/2005 | Lim | 380/29 |
| 6,931,127 B1* | 8/2005 | Lim | 380/37 |
| 2002/0003876 A1* | 1/2002 | Lim | 380/29 |
| 2002/0009196 A1* | 1/2002 | Lim | 380/37 |
| 2002/0012430 A1* | 1/2002 | Lim | 380/29 |
| 2002/0018562 A1* | 2/2002 | Lim | 380/37 |
| 2002/0051534 A1* | 5/2002 | Matchett et al. | 380/37 |
| 2003/0002664 A1* | 1/2003 | Anand | 380/37 |
| 2004/0028232 A1* | 2/2004 | Lindemann et al. | 380/259 |

OTHER PUBLICATIONS

Eli Biham, A Fast New DES Implementation in Software, Lecture Notes in Computer Science, vol. 1267, Jan. 1997, p. 260.*

Bindel et al., "Extended Cryptographic File System," pp. 1-11 (Dec. 13, 1999).

Blaze, "A Cryptographic File System for Unix," Proc. of 1st ACM Conf. on Computer & Communications Security, 8 pages (Nov. 1993).

Blaze, "Key Mangement in an Encrypting File System," Proc. Summer 1994 USENIX Tech. Conf., 9 pages (Jun. 1994).

Zadok et al., "Cryptfs: A Stackable Vnode Level Encryption File System," Tech. Report CUCS-021-98, pp. 1-11 (1998).

* cited by examiner

| $y_1$ | $y_2$ | $y_3$ | $y_4$ | $y_5$ | $y_6$ | $y_7$ | $y_8$ | $y_9$ | $y_{10}$ | $y_{11}$ | $y_{12}$ |

| $k_1$ | $k_2$ | $k_3$ | $k_4$ | $k_5$ | $k_6$ | $k_7$ | $k_8$ | $k_9$ | $k_{10}$ | $k_{11}$ | $k_{12}$ |

| $y_{13}$ | $y_{14}$ | $y_{15}$ | $y_{16}$ | $y_{17}$ | $y_{18}$ | $y_{19}$ | $y_{20}$ | $y_{21}$ | $y_{22}$ | $y_{23}$ | $y_{24}$ |

| $k_{13}$ | $k_{14}$ | $k_{15}$ | $k_{16}$ | $k_{17}$ | $k_{18}$ | $k_{19}$ | $k_{20}$ | $k_{21}$ | $k_{22}$ | $k_{23}$ | $k_{24}$ |

| $y_{25}$ | $y_{26}$ | $y_{27}$ | $y_{28}$ | $y_{29}$ | $y_{30}$ | $y_{31}$ | $y_{32}$ | $y_{33}$ | $y_{34}$ | $y_{35}$ | $y_{36}$ |

| $k_{25}$ | $k_{26}$ | $k_{27}$ | $k_{28}$ | $k_{29}$ | $k_{30}$ | $k_{31}$ | $k_{32}$ | $k_{33}$ | $k_{34}$ | $k_{35}$ | $k_{36}$ |

| $y_{37}$ | $y_{38}$ | $y_{39}$ | $y_{40}$ | $y_{41}$ | $y_{42}$ | $y_{43}$ | $y_{44}$ | $y_{45}$ | $y_{46}$ | $y_{47}$ | $y_{48}$ |

| $k_{37}$ | $k_{38}$ | $k_{39}$ | $k_{40}$ | $k_{41}$ | $k_{42}$ | $k_{43}$ | $k_{44}$ | $k_{45}$ | $k_{46}$ | $k_{47}$ | $k_{48}$ |

| $x_{32}$ | $x_1$ | $x_2$ | $x_3$ | $x_4$ | $x_5$ | $x_6$ | $x_7$ | $x_8$ | $x_9$ | 0 | 0 |

$\oplus$

| $k_1$ | $k_2$ | $k_3$ | $k_4$ | $k_5$ | $k_6$ | $k_9$ | $k_{10}$ | $k_{11}$ | $k_{12}$ | $(k_7 \oplus k_5)$ | $(k_8 \oplus k_6)$ |

FIG. 9

| $x_8$ | $x_9$ | $x_{10}$ | $x_{11}$ | $x_{12}$ | $x_{13}$ | $x_{14}$ | $x_{15}$ | $x_{16}$ | $x_{17}$ | 0 | 0 |

$\oplus$

| $k_{13}$ | $k_{14}$ | $k_{15}$ | $k_{16}$ | $k_{17}$ | $k_{18}$ | $k_{21}$ | $k_{22}$ | $k_{23}$ | $k_{24}$ | $(k_{19} \oplus k_{17})$ | $(k_{20} \oplus k_{18})$ |

FIG. 10

| $x_{16}$ | $x_{17}$ | $x_{18}$ | $x_{19}$ | $x_{20}$ | $x_{21}$ | $x_{22}$ | $x_{23}$ | $x_{24}$ | $x_{25}$ | 0 | 0 |

$\oplus$

| $k_{25}$ | $k_{26}$ | $k_{27}$ | $k_{28}$ | $k_{29}$ | $k_{30}$ | $k_{33}$ | $k_{34}$ | $k_{35}$ | $k_{36}$ | $(k_{31} \oplus k_{29})$ | $(k_{32} \oplus k_{30})$ |

FIG. 11

| $x_{24}$ | $x_{25}$ | $x_{26}$ | $x_{27}$ | $x_{28}$ | $x_{29}$ | $x_{30}$ | $x_{31}$ | $x_{32}$ | $x_1$ | 0 | 0 |

$\oplus$

| $k_{37}$ | $k_{38}$ | $k_{39}$ | $k_{40}$ | $k_{41}$ | $k_{42}$ | $k_{45}$ | $k_{46}$ | $k_{47}$ | $k_{48}$ | $(k_{43} \oplus k_{41})$ | $(k_{44} \oplus k_{42})$ |

FIG. 12

METHOD OF IMPLEMENTING THE DATA ENCRYPTION STANDARD WITH REDUCED COMPUTATION

BACKGROUND OF THE INVENTION

1. Field of the Invention

The present invention relates generally to encryption and decryption. The invention relates more specifically to a unique software implementation of the round function of the Data Encryption Standard to reduce required computation.

2. Description of the Related Art

An encryption algorithm provides data confidentiality by disguising data such that an outsider that obtains the disguised data cannot recover the original data with a reasonable amount of time and effort. The Data Encryption Standard (DES), described in U.S. Pat. No. 3,962,539, is a highly popular symmetric-key encryption algorithm. The DES encryption algorithm accepts a 64-bit plaintext block P and a 56-bit key K as inputs, and the algorithm outputs a 64-bit ciphertext block C. The plaintext block P is the data to be disguised, and the ciphertext block C is the disguised result. Similarly, the DES decryption algorithm accepts a 64-bit ciphertext block C and the 56-bit secret key K as inputs and the decryption algorithm outputs the 64-bit plaintext block P. FIGS. 1 and 2 illustrate DES decryption and encryption, respectively. Encryption is denoted as DES and decryption is denoted as $DES^{-1}$.

DES is a symmetric-key cipher because the decryption key is equivalent to the encryption key. If DES is secure, an outsider cannot easily recover P given C without knowledge of the secret key K. In addition, an outsider cannot easily discover the secret key K given a plaintext block P and the corresponding ciphertext block C encrypted under K.

In the context of available computing power, DES suffers from insufficient key length. Given a plaintext P and the corresponding ciphertext C for some key K, an outsider can recover the secret key K by observing the results of the DES encryption of P using all possible values for K. This brute-force attack can be completed in a short period of time using a reasonable amount of computer hardware. To prevent such an attack, some communications and storage security systems employ Triple DES (3DES). Triple DES provides a larger effective key length than DES by sequentially encrypting a plaintext block with DES three times using three different keys.

DES encrypts a plaintext block in three steps, as illustrated in FIG. 3. First, DES performs a fixed initial permutation on the bits of the 64-bit plaintext block. The result of this permutation is then subjected to 16 identical rounds of permutation and substitution operations. The jth DES round, where $1 \leq j \leq 16$, employs a 48-bit round key RK(j) that is deterministically generated from K. Lastly, DES performs a fixed final permutation on the output of the sixteenth round. The result of this final permutation is the 64-bit ciphertext block. Decryption proceeds in the same manner, but the 16 round keys generated from K are used in reverse order. More specifically, the jth round in DES decryption uses the round key RK(17−j).

FIG. 4 depicts the jth DES encryption round. The values L(j) and R(j) are the leftmost 32 bits and the rightmost 32 bits of the 64-bit input to the jth round, respectively. K is the 56-bit DES secret key. The encryption round proceeds as follows. R(j) is subjected to the Expansion Permutation, a fixed mapping of the 32 bits of R(j) to a 48-bit output. Since the number of bits in the output is greater than that of the input, some input bits are mapped to multiple output bits.

The 48-bit result of the Expansion Permutation is then XORed with the output of the round key generation function F. F is a nonlinear function that accepts the 56-bit DES secret key K and the round number j as inputs; F outputs a 48-bit result, RK(j), which is the round key. The result of the XOR operation between the round key and the output of the Expansion Permutation is then divided into eight 6-bit blocks. These 6-bit blocks are applied as inputs to the eight DES S-boxes. Each S-box accepts a 6-bit input and outputs a 4-bit result, and the S-boxes represent fixed nonlinear functions of the input bits. The 32 output bits of the S-boxes are then subjected to the DES P-box Permutation. The P-box Permutation is a fixed bijective permutation that maps 32 input bits to 32 output bits. Lastly, the output of the P-box is XORed with L(j), and this 32-bit result is R(j+1) in the next round. The value of L(j+1) in the next round is simply the value of R(j) from the current round.

Implementing permutations in hardware is trivial: Wires representing input bits can simply be connected to wires representing the output bits without using any gates or other logic. In software, however, performing bit-level permutation is a difficult task. Instruction set architectures for existing general-purpose microprocessors do not include instructions that can be used to efficiently complete such permutations. Performing a bit-level permutation of an n-bit register can require as many as O(n) instructions on general-purpose RISC or CISC microprocessors.

The round key computation function F is difficult to compute in software, for F involves a bit-level permutation. In practice, however, the function F is rarely executed. A DES secret key K will often be used to encrypt/decrypt hundreds, thousands, or even millions of bytes of data. The 16 round keys corresponding to a secret key K can be computed once prior to the encryption/decryption of all the 64-bit blocks of the data rather than once for each 64-bit block. Hence, the computation cost of calculating F is usually negligible; the computation is amortized over the encryption/decryption of many data blocks.

The S-boxes are usually implemented as lookup tables in software. We refer to the input to an S-box lookup table as the index, and we refer to the possible outputs of the S-box as the table entries. To eliminate processing associated with the P-box Permutation, software implementations of DES often combine the P-box Permutation with the S-box lookup tables to form SP-box lookup tables. Each S-box outputs a 4-bit value, but the SP-boxes output a 32-bit or larger value in which the 4-bit S-box result is already permuted per the P-box Permutation. Hence, no explicit run-time processing is needed to complete the P-box Permutation: The permutation is built into the eight SP-box lookup tables. If the SP-box outputs are 32 bits in size, the 28 output bits that do not represent bits of the original 4-bit S-box output are set to zeroes. The results of the eight SP-box outputs can be combined by performing seven bitwise logical XOR or bitwise logical OR operations following the eight SP-box table lookups.

TABLE 1

| DES EXPANSION PERMUTATION | | | | | | | | | | | |
|---|---|---|---|---|---|---|---|---|---|---|---|
| 32 | 1 | 2 | 3 | 4 | 5 | 4 | 5 | 6 | 7 | 8 | 9 |
| 8 | 9 | 10 | 11 | 12 | 13 | 12 | 13 | 14 | 15 | 16 | 17 |
| 16 | 17 | 18 | 19 | 20 | 21 | 20 | 21 | 22 | 23 | 24 | 25 |
| 24 | 25 | 26 | 27 | 28 | 29 | 28 | 29 | 30 | 31 | 32 | 1 |

Table 1 illustrates the DES Expansion Permutation. The Expansion Permutation is easier to compute than the P-box Permutation in software, for most of the permutation involves 6-bit blocks rather than individual bits. Each entry represents a bit of the 48-bit permutation output; the entries are arranged in increasing order from left to right and then from top to bottom. The number in each entry indicates the location of the bit in the 32-bit input that is mapped to the output bit corresponding to that entry. For example, bit 2 of the 32-bit input R(j) is mapped to bit 3 of the Expansion Permutation output, as the numeral 2 appears in the third entry. Similarly, bit 12 of R(j) is mapped to bits 17 and 19 of the output. In straightforward software implementations of DES, the Expansion Permutation requires very little computation. The inputs to six of the eight S-boxes are simply the XOR results of six contiguous bits of R(j) with six bits of the round key R(j). Preparing the inputs to the first and the eighth S-boxes requires additional special computation due to discontinuities in the Expansion Permutation. For example, the first six bits of the output of the Expansion Permutation, which are involved in the generation of the input to the first SP-box, include bits from both the right and the left ends of the 32-bit value R(j). These discontinuities are easy to handle. On many RISC processors, only one assembly instruction—if any at all—per DES round is required to complete this special computation.

To improve performance of software implementations of DES for processors with large memory caches, the SP-box lookup tables can be combined in pairs to form four large lookup tables. By using four SP-box tables rather than eight, the number of table lookups per round is reduced from eight to four, and the number of bitwise XOR (or bitwise OR) operations required to combine the results is reduced from seven to three. Each of these large SP-box tables is indexed with a 12-bit input (from the combination of two 6-bit inputs) and contains 4096 entries. A table entry in a large SP-box corresponding to a 12-bit index W, which is the concatenation of two 6-bit indexes U and V, is the result of bitwise XORing the entry corresponding to the index U in the first small table with the entry corresponding to the index V in the second small table. If the size of a table entry is 32 bits, the total size of all four tables is 64 kilobytes. Large SP-boxes do not reduce the number of instructions required to complete the Expansion Permutation and the round key XOR operations, however.

SUMMARY OF THE INVENTION

The present invention improves the throughput of software implementations of DES (that employ large SP-boxes) through mathematical transformations performed on the DES round function and on the DES round key computation function F. More specifically, this invention enables an implementation of the DES round that requires fewer assembly instructions to complete than existing implementations. The invention furnishes this performance improvement by shifting computation associated with the Expansion Permutation in the DES round to the infrequently executed round key computation function F.

The SP-box lookup tables are combined in pairs to produce four large SP-box lookup tables, and these four lookup tables are indexed as illustrated in FIGS. 5 through 8. We refer to the 48-bit output of the Expansion Permutation as Y. The variable $y_i$ represents the ith bit of Y, where $y_1$ is the least significant bit and $y_{48}$ is the most significant bit. Similarly, $k_i$ represents the ith bit of the round key RK(j), where $k_1$ is the least significant bit and $k_{48}$ is the most significant bit. The symbol $\oplus$ represents the bitwise logical XOR operator. For example, the leftmost bit of the index to the first large SP-box would be the XOR of the two bits $y_1$ and $k_1$.

Let us consider the 12-bit input the second large SP-box. We call this 12-bit input A. The DES round function essentially requires the same number and types of operations to produce each of SP-box inputs; the following transformations can be applied to all four of the large SP-boxes and their respective inputs. As shown in FIG. 6, A is the result of bitwise logically XORing certain bits of the round key with certain bits of Y as follows:

| $y_{13}$ | $y_{14}$ | $y_{15}$ | $y_{16}$ | $y_{17}$ | $y_{18}$ $\oplus$ $y_{19}$ | | $y_{20}$ | $y_{21}$ | $y_{22}$ | $y_{23}$ | $y_{24}$ |
|---|---|---|---|---|---|---|---|---|---|---|---|
| $k_{13}$ | $k_{14}$ | $k_{15}$ | $k_{16}$ | $k_{17}$ | $k_{18}$ | $k_{19}$ | $k_{20}$ | $k_{21}$ | $k_{22}$ | $k_{23}$ | $k_{24}$ |

Since the Expansion Permutation is fixed, we can rewrite A as follows:

| $x_8$ | $x_9$ | $x_{10}$ | $x_{11}$ | $x_{12}$ | $x_{13}$ $\oplus$ $x_{12}$ | | $x_{13}$ | $x_{14}$ | $x_{15}$ | $x_{16}$ | $x_{17}$ |
|---|---|---|---|---|---|---|---|---|---|---|---|
| $k_{13}$ | $k_{14}$ | $k_{15}$ | $k_{16}$ | $k_{17}$ | $k_{18}$ | $k_{19}$ | $k_{20}$ | $k_{21}$ | $k_{22}$ | $k_{23}$ | $k_{24}$ |

The 32-bit input to the Expansion Permutation is referred to herein as X. The variable $x_i$ represents the ith bit of X, where $x_1$ is the least significant bit and $x_{32}$ is the most significant bit. Since we are considering the input to the second large SP-box, the bits of X correspond to the second row of the Table 1. It is seen that the Expansion Permutation maps a pair of bits, $x_{12}$ and $x_{13}$, to two locations in Y.

Described hereinafter are software implementations of DES using general-purpose RISC processor assembly instructions. A straightforward implementation of DES round function requires at least 7 simple RISC assembly instructions to compute A, the 12-bit input for the second large SP-box. Pseudo assembly for the computation of A is listed below:

```
LOAD    M              ->  RK
SHIFTR  X,    0x7      ->  U
SHIFTR  X,    0x5      ->  V
AND     U,    0x03F    ->  U
AND     V,    0xFC0    ->  V
XOR     U,    V        ->  Y
XOR     Y,    RK       ->  A
```

The register X represents the 32-bit variable X, the register Y is used to store bits 13 through 24 of the variable Y, and the register RK is used to store bits 13 through 24 of the round key RK(j). The registers U and V store temporary variables. In the first instruction, the appropriate 12-bit chunk of the round key is loaded from memory address M. More specifically, bits 13 through 24 of RK(j) are loaded into the 12 least significant bits of RK. Depending on the instruction set architecture, this round key loading operation may require more than one instruction. The next 5 instructions shift and isolate the appropriate 12 bits of X to generate bits 13 through 24 of Y. In the two SHIFTR instructions, the register X is logically right shifted by seven and five bits, and the results are stored in registers U and V, respectively. During the execution of the two AND instructions, the processor performs bitwise AND operations on U and V to isolate bits 8 through 13 of X (in register U) and bits 12 through 17 of X (in register V). After the completion of the first XOR instruction, the 12 least significant bits of register Y contain bits 13 through 24 of Y. In the last XOR instruction, register Y is bitwise logically XORed with register RK, and A, the input to the second large SP-box, is stored in the 12 least significant bits of the register A.

If more sophisticated assembly instructions are available, it is possible to achieve the result of the above assembly sequence using fewer instructions. For example, the five inner instructions can be replaced with 3 EXTRACT and DEPOSIT instructions.

The present invention enables a reduction in the number of instructions required to compute the inputs for the four large SP-boxes. More specifically, this invention can be used to reduce the length of the previously described assembly code sequence from seven instructions to four instructions. If EXTRACT and DEPOSIT are used, the number of instructions can be reduced from five to three with this invention.

BRIEF DESCRIPTION OF THE DRAWING

The above and other objects and advantages of the present invention will become apparent from the following description when read in conjunction with the accompanying drawing wherein:

FIGS. 9 through 12 are representations of index computation for the RSP-boxes used in the invention.

DETAILED DESCRIPTION OF THE PREFERRED EMBODIMENT

Figure 1:
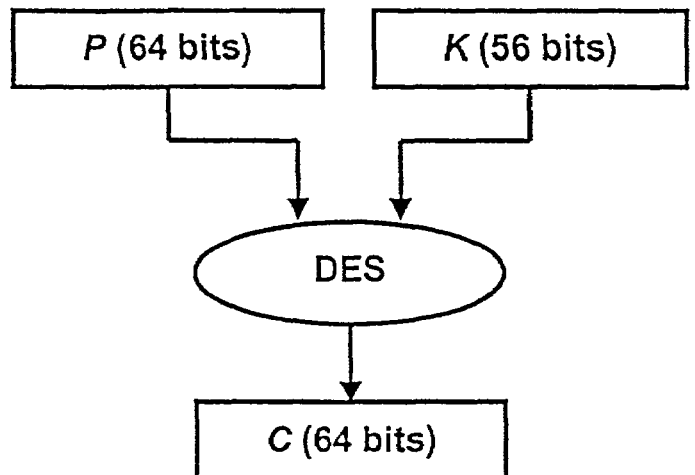
FIG. 1 is a simplified prior art illustration of DES encryption.
Figure 2:
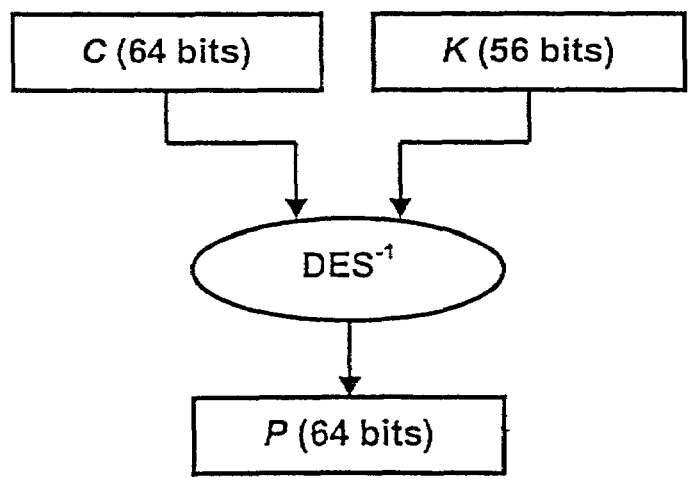
FIG. 2 is a simplified prior art illustration of DES decryption.
Figure 3:
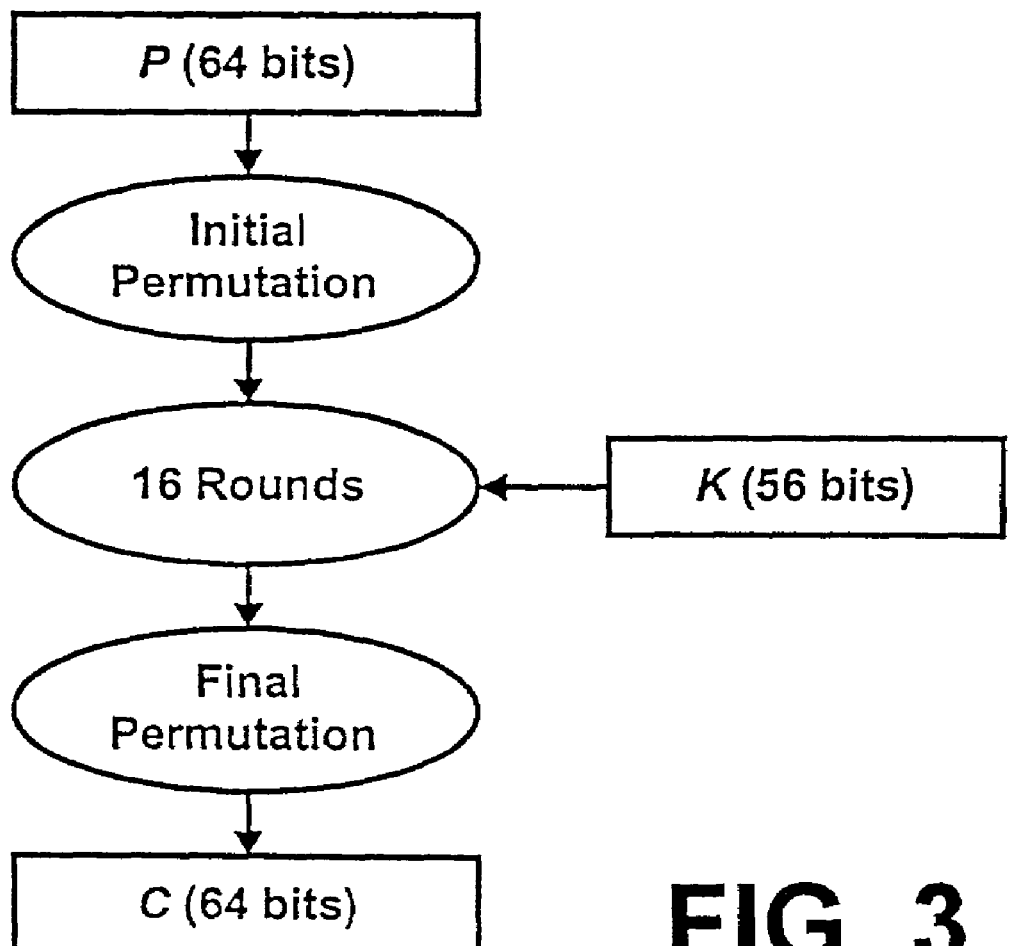
FIG. 3 is a prior art flow diagram of the steps for DES encryption of a plaintext block.
Figure 4:
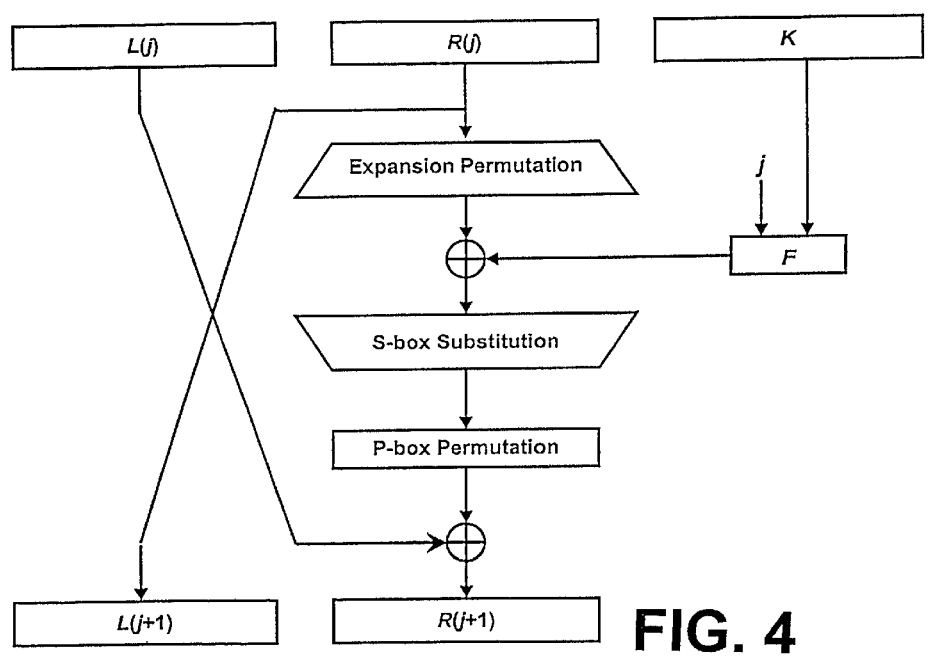
FIG. 4 is a prior art flow diagram of the steps for a single DES encryption round.
Figure 5:
FIGS. 5 through 8 are representations of index computations for the four large SP-boxes used in the invention.
Figure 6:
Figure 7:
Figure 8:

We begin by describing a new indexing scheme for the large SP-boxes. We refer to the new input into the second large SP-box as B. The variable $b_i$ represents the ith bit of B where $b_1$ is the least significant bit and $b_{12}$ is the most significant bit. B is calculated as follows:

| $x_8$ | $x_9$ | $x_{10}$ | $x_{11}$ | $x_{12}$ | $x_{13}$ | $x_{14}$ | $x_{15}$ | $x_{16}$ | $x_{17}$ | 0 | 0 |
|---|---|---|---|---|---|---|---|---|---|---|---|
| | | | | | | | $\oplus$ | | | | |
| $k_{13}$ | $k_{14}$ | $k_{15}$ | $k_{16}$ | $k_{17}$ | $k_{18}$ | $k_{21}$ | $k_{22}$ | $k_{23}$ | $k_{24}$ | $(k_{19} \oplus k_{17})$ | $(k_{20} \oplus k_{18})$ |

The leftmost (i.e., least significant) 10 bits of B consist of all 12 bits of A except $(x_{13} \oplus k_{20})$ and $(x_{12} \oplus k_{19})$. We can infer the values of $(x_{13} \oplus k_{20})$ and $(x_{12} \oplus k_{19})$ by logically XORing bits of B together. By the properties of the XOR operator:

$(b_{12} \oplus b_6) = (k_{20} \oplus k_{18}) \oplus (x_{13} \oplus k_{18}) = (x_{13} \oplus k_{20})$ $(b_{11} \oplus b_5) = (k_{19} \oplus k_{17}) \oplus (x_{12} \oplus k_{17}) = (x_{12} \oplus k_{19})$ From these expressions, it can be concluded that B contains at least as much information as A. We can therefore obtain the correct output from the second large SP-box using the input B (rather than A) if we rearrange the large SP-box entries. This static rearrangement of SP-box entries occurs at or before software compile time, and therefore the computation required to reorder the entries does not affect DES encryption or decryption performance.

To generate B, we require a single block of contiguous bits from X rather than two blocks of contiguous bits (as required to generate A). As a result, the present invention enables a software implementation of the DES round that employs fewer assembly instructions to compute B and the other three inputs to the rearranged large SP-boxes. We avoid the computation cost associated with generating the modified round keys required to compute the inputs to the rearranged SP-boxes by performing the necessary XOR and shift operations during the computation of F. The new F would output modified round keys that could be directly XORed with contiguous bits of X to properly index the rearranged SP-boxes. Since the function F is computed infrequently relative to the execution of the DES round, the computation cost of performing the additional XOR and shift operations is negligible.

This invention includes all possible methods of generating indexes to rearranged SP-boxes (that each contain 4096 or more entries) in which a block of contiguous bits from X is directly XORed with a modified round key. The method used to rearrange the entries of the large SP-boxes depends on the method used to generate the new inputs to the SP-boxes, however. For example, B, the input to the second large rearranged SP-box could alternatively be calculated as follows:

| 0 | 0 | $x_8$ | $x_9$ | $x_{10}$ | $x_{11}$ | $x_{12}$ | $x_{13}$ | $x_{14}$ | $x_{15}$ | $x_{16}$ | $x_{17}$ |
|---|---|---|---|---|---|---|---|---|---|---|---|
| | | | | | | $\oplus$ | | | | | |
| $(k_{19} \oplus k_{17})$ | $(k_{20} \oplus k_{18})$ | $k_{13}$ | $k_{14}$ | $k_{15}$ | $k_{16}$ | $k_{17}$ | $k_{18}$ | $k_{21}$ | $k_{22}$ | $k_{23}$ | $k_{24}$ |

The same number of assembly instructions would be required to compute the original and alternative versions of B, but the SP-boxes would have to be rearranged differently in the two cases to guarantee the correct output of the DES round.

Depending on the processor that executes the software, two blocks of contiguous bits of X (rather than one block) may be required to generate the input to the first large rearranged SP-box, the input to the fourth large rearranged SP-box, or the inputs to both the first and the fourth large rearranged SP-boxes. The Expansion Permutation maps the 1st and the 32nd bits of X to the inputs to the first and the fourth large (original and rearranged) SP-boxes. Since these bits may not be contiguous in a register that stores X or a function of X, two blocks of contiguous bits of X may need to be employed to generate the said SP-box inputs. This invention includes all methods of generating the input to a large rearranged SP-box using two blocks of contiguous bits of X if one block includes the first bit of the rightmost 32 bits of the input to the DES round and the other block includes the 32nd bit of the rightmost 32 bits of the input to the DES round.

We now describe a sample implementation of the invention. The entries of four large SP-boxes are rearranged as follows. In each of the four SP-box lookup tables, each of the 4096 possible 12-bit indexes corresponds to a different 32-bit entry. Let the 12-bit index be adcdefghijkl, where each letter represents a single bit:

| a | b | c | d | e | f | g | h | i | j | k | l |
|---|---|---|---|---|---|---|---|---|---|---|---|

The leftmost letter, a, represents the least significant bit of the index, and the rightmost letter, 1, represents the most significant bit. A 32-bit entry in an original large SP-box with corresponding index abcdefghijkl will be mapped to the entry in a rearranged RSP-box corresponding to the following index:

| a | b | c | d | e | f | i | j | k | l | (g⊕e) | (h⊕f) |
|---|---|---|---|---|---|---|---|---|---|-------|-------|

The rearranged large SP-boxes are hereinafter referred to as RSP-boxes. No entries are exchanged between different SP-boxes. All the entries from the first large SP-box will be mapped to locations in the first RSP-box, all the entries from the second large SP-box will be mapped to locations in the second RSP-box, etc. In addition, no modifications are made to the contents of the table entries; the rearrangement treats entries as atomic elements and simply involves permuting the entries within the SP-boxes as described above.

In addition to making changes to the large SP-boxes, we also modify the round key computation function F. The following bits of the round key need to be logically XORed with bits of X in order to generate B and properly index the second RSP-box:

| $k_{13}$ | $k_{14}$ | $k_{15}$ | $k_{16}$ | $k_{17}$ | $k_{18}$ | $k_{21}$ | $k_{22}$ | $k_{23}$ | $k_{24}$ | $(k_{19} \oplus k_{17})$ | $(k_{20} \oplus k_{18})$ |
|---|---|---|---|---|---|---|---|---|---|---|---|

As explained herein, using the present invention, we avoid the computation cost of preparing the modified round keys by performing the necessary operations when computing the round key computation function F. The appropriate block of the modified round key can then be directly loaded from memory and XORed with bits of X during the execution of the DES round.

We now describe how to generate the four indexes for all four RSP-boxes. FIGS. 9 through 12 illustrate which bits of X need to be XORed with bits of the round key to generate the four indexes. While the invention has been described primarily in terms of XOR operations, this invention includes all possible methods of modifying or adding operations to the DES round key computation function that enable the novel SP-box indexing scheme described herein.

Using the mathematical transformation of the present invention, software implementations of a DES round can employ contiguous blocks of bits from X when computing the indexes for the large SP-boxes. As a result, generating the input to an RSP-box requires only four conventional RISC assembly instructions rather than seven. Pseudo assembly for the computation of B, the index into the second RSP-box, is listed below:

```
LOAD    M                  ->   RK
SHIFTR  X,      0x7        ->   U
AND     U,      0x3FF      ->   U
XOR     U,      RK         ->   B
```

The first instruction loads the modified round key from memory address M and stores the result in register RK. The next two instructions place bits 8 through 17 of X in the least significant bits of register U. If instructions such as EXTRACT are available, these two instructions can be replaced with a single instruction. Lastly, the modified round key is XORed with bits 8 through 17 of X to generate the index B.

Having thus disclosed a preferred embodiment of the invention, it is understood that modifications and variations may be readily carried out without deviating from the underlying inventive principles described herein, and that the invention is limited only by the appended claims and their equivalents.

What is claimed is:

1. A method of reducing computation during each Data Encryption Standard (DES) encryption and decryption round, the method comprising the steps of:
   a) generating at least one large SP-box lookup table;
   b) computing an index for each SP-box lookup table;
   c) adding operations to the DES round key computation function to obtain a modified round key computation function; and
   d) computing the index for each SP-box by performing XOR operations between at least one block of contiguous bits of the input to the DES Expansion Permutation and said modified round key computation function.

2. A method of reducing the number of software instructions required to perform permutation and substitution operations using Data Encryption Standard (DES) encryption and decryption rounds, wherein each round has a 64-bit input, and 32 bits of that 64-bit input are applied as the input to the DES Expansion Permutation, the method comprising the steps of:
   a) generating at least one large SP-box lookup table;
   b) adding operations to the DES round key computation function to obtain a modified round key computation function;
   c) computing a modified SP-box index by performing XOR operations between at least one block of contiguous bits of the 32-bit input to the DES Expansion Permutation and the result of the modified round key computation function of step b); and
   d) executing each subsequent round of DES computation by repeating steps a) and c).

3. The method recited in claim 2, wherein steps a) through d) are carried out in a digital processor.

4. The method recited in claim 3, wherein said digital processor is taken from the group consisting of a general-purpose processor, an embedded processor and a cryptographic processor.

5. The method recited in claim 2, wherein step c) comprises the step of selecting two blocks of contiguous bits of the 32-bit input to DES Expansion Permutation.

6. The method recited in claim 5, wherein one of said two blocks includes the least significant bit of said 32-bit input and the other of said two blocks includes the most significant bit of said 32-bit input for each of said round.

7. The method recited in claim 2, wherein step c) is carried out by permuting the entries within each SP-box lookup table.

8. In a processor carrying out a Data Encryption Standard (DES) computation by iterative DES rounds, a method of reducing computation associated with the DES Expansion Permutation by reducing the number of instructions required to compute the inputs to DES SP-boxes, the method comprising the steps of:

a) mathematically transforming the DES round function in each said round;
b) mathematically transforming the DES round key computation function in each said round; and
c) modifying the inputs to said SP-boxes in accordance with the results of steps a) and b).

9. The method recited in claim 8, wherein steps a) and b) are carried out so that computation in the DES Expansion Permutation is shifted from the DES round function to the DES round key computation function.

10. An apparatus for reducing computation during each Data Encryption Standard (DES) encryption and decryption round, the apparatus comprising:
a) means for generating at least one large SP-box lookup table;
b) means for computing an index for each SP-box lookup table;
c) means for adding operations to the DES round key computation function to obtain a modified round key computation function; and
d) means for computing the index for each said SP-box by performing XOR operations between at least one block of contiguous bits of the input to the DES Expansion Permutation and said modified round key computation function.

11. An apparatus for reducing the number of software instructions required to perform permutation and substitution operations in the Data Encryption Standard (DES) encryption and decryption rounds, wherein each round has a 64-bit input and 32 bits of that 64-bit input are applied as the input to the DES Expansion Permutation, the apparatus comprising:
a) means for generating at least one large SP-box lookup table;
b) means for adding operations to the DES round key computation function to obtain a modified round key computation function; and
c) means for computing a modified SP-box index by performing XOR operations between at least one selected block of said 32-bit input to the DES Expansion Permutation and the result of the modified round key computation function.

12. The apparatus recited in claim 11, wherein said means for computing comprises a digital processor.

13. The apparatus recited in claim 12, wherein said digital processor is taken from the group consisting of a general-purpose processor, an embedded processor and a cryptographic processor.

14. The apparatus recited in claim 11, wherein said means for computing comprises means for selecting two blocks of said 32-bit input to the DES Expansion Permutation.

15. The apparatus recited in claim 14, wherein one of said two blocks includes the least significant bit of said 32-bit input and the other of said two blocks includes the most significant bit of said 32-bit input for each of said round.

16. The apparatus recited in claim 11, wherein said means for generating comprises means for permuting the entries within each said SP-box lookup table.

17. In a processor carrying out a Data Encryption Standard (DES) computation by iterative DES rounds, an apparatus for reducing computation associated with the DES Expansion Permutation by reducing the number of instructions required to compute the inputs to DES SP-boxes, the apparatus comprising:
a) means for mathematically transforming the DES round function in each said round;
b) means for mathematically transforming the DES round key computation function in each said round; and
c) means for modifying the inputs to said SP-boxes in accordance with the transformations of said round function and of said round key computation function.

18. The apparatus recited in claim 17, wherein means for modifying comprises means for shifting computation in the DES Expansion Permutation from the DES round function to the DES round key computation function.

19. A data processing system for carrying out Data Encryption Standard (DES) encryption and decryption rounds with reduced computation, the system comprising:
a) computer processing means for processing data;
b) storage means providing four large SP-box lookup tables;
c) means for computing indices for the respective SP-box lookup tables;
d) means for adding operations to the DES round key computation function to obtain a modified round key computation function; and
e) means for computing the index of each said SP-box by performing XOR operations between at least one block of contiguous bits of the input to the DES Expansion Permutation and said modified round key computation function.

* * * * *

UNITED STATES PATENT AND TRADEMARK OFFICE
CERTIFICATE OF CORRECTION

PATENT NO. : 7,103,180 B1
APPLICATION NO. : 10/001682
DATED : September 5, 2006
INVENTOR(S) : John Patrick McGregor, Jr. et al.

Page 1 of 1

It is certified that error appears in the above-identified patent and that said Letters Patent is hereby corrected as shown below:

On the Title page, in field (56), under "U.S. PATENT DOCUMENTS", in column 2, below "6,031,911 A * 2/2000 Adams et al. ........ 380/29"
insert -- 6,182,216 A * 1/2001 Luyster, Frank C. ........ 713/168 --.

In column 3, line 15, delete "R(j)" and insert -- RK(j) --, therefor.

In column 3, line 63, after "variable" delete "y," and insert -- $y_1$ --, therefor.

Signed and Sealed this

Eighth Day of December, 2009

David J. Kappos
*Director of the United States Patent and Trademark Office*